US010762468B2

(12) United States Patent
Brazeau

(10) Patent No.: US 10,762,468 B2
(45) Date of Patent: Sep. 1, 2020

(54) ADAPTIVE PROCESS FOR GUIDING HUMAN-PERFORMED INVENTORY TASKS

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 707 days.

(21) Appl. No.: 15/273,543

(22) Filed: Sep. 22, 2016

(65) Prior Publication Data

US 2018/0082244 A1 Mar. 22, 2018

(51) Int. Cl.

| | |
|---|---|
| ***G06Q 10/08*** | (2012.01) |
| ***G06F 3/01*** | (2006.01) |
| ***G06T 7/73*** | (2017.01) |
| ***G06F 3/03*** | (2006.01) |
| *H04N 5/225* | (2006.01) |

(52) U.S. Cl.

CPC ........... *G06Q 10/087* (2013.01); *G06F 3/012* (2013.01); *G06F 3/013* (2013.01); *G06F 3/0304* (2013.01); *G06T 7/73* (2017.01); *H04N 5/225* (2013.01)

(58) Field of Classification Search

USPC .......................... 345/8, 660; 348/46; 705/28

See application file for complete search history.

(56) References Cited

U.S. PATENT DOCUMENTS

| | | | | |
|---|---|---|---|---|
| 7,027,621 | B1 | 4/2006 | Prokoski | |
| 8,423,431 | B1 * | 4/2013 | Rouaix | B65G 1/1373 705/28 |
| 8,965,562 | B1 | 2/2015 | Wurman | |
| 9,411,412 | B1 | 8/2016 | Kritarth | |
| 2004/0183751 | A1 * | 9/2004 | Dempski | G02B 27/017 345/8 |
| 2005/0059488 | A1 | 3/2005 | Larsen | |
| 2010/0253493 | A1 | 10/2010 | Szczerba et al. | |
| 2012/0144334 | A1 | 6/2012 | Poulos | |
| 2014/0098210 | A1 | 4/2014 | Larter | |
| 2014/0111550 | A1 * | 4/2014 | Abraham | G09G 5/00 345/660 |
| 2015/0007114 | A1 | 1/2015 | Reichert | |

(Continued)

OTHER PUBLICATIONS

Extended European Search Report dated Jan. 21, 2020, in counterpart European Appl. No. EP 17853721.3.

(Continued)

*Primary Examiner* — Oluseye Iwarere
*Assistant Examiner* — Reva R Moore
(74) *Attorney, Agent, or Firm* — Knobbe, Martens, Olson & Bear, LLP

(57) ABSTRACT

An inventory management system is described. The inventory management system may be configured to determine a head or eye level of an operator interacting with a storage structure. As part of this process, visual image data, thermal image data, or LiDAR data can be obtained and the eyes or head of the operator identified in the obtained data, or the operator may wear a device usable to determine head or eye position. The determined head or eye level can be correlated with a vertical position on a display, and inventory information can be displayed to the operator at the determined level.

22 Claims, 7 Drawing Sheets

100
55
30
10
15
50
25
STORAGE STRUCTURE 5
CAPTURE IMAGE(S) OF OPERATOR INTERACTING WITH OR ADJACENT TO STORAGE STRUCTURE 101
ANALYZE IMAGE(S) AND IDENTIFY POSITION CORRESPONDING TO OPERATOR HEAD OR EYE LEVEL 102
INVENTORY MANAGEMENT SYSTEM 20
RETRIEVE CONTEXTUAL INFORMATION AND LOCATION INFORMATION ASSOCIATED WITH AN ITEM IN STORAGE STRUCTURE 103
INVENTORY MANAGEMENT SYSTEM 20
30
10
35
40
45B
45A
25
STORAGE STRUCTURE 5
DISPLAY CONTEXTUAL INFORMATION TO OPERATOR AT IDENTIFIED LEVEL; DISPLAY POINTER(S) BASED ON LOCATION INFORMATION 104

(56) References Cited

U.S. PATENT DOCUMENTS

2015/0247721 A1* 9/2015 Barkley ............... H04N 13/106
348/46

OTHER PUBLICATIONS

International Search Report and the Written Opinion of the International Searching Authority dated Dec. 4, 2017 in PCT/US2017/052073.
Specification and drawings as filed in U.S. Appl. No. 15/187,535 on Jun. 20, 2016.

* cited by examiner

ADAPTIVE PROCESS FOR GUIDING HUMAN-PERFORMED INVENTORY TASKS

BACKGROUND

Modern inventory systems, such as those in mail-order and e-commerce warehouses, airport luggage systems, and custom-order manufacturing facilities, face significant challenges in providing fast, accurate responses to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.). In inventory systems tasked with responding to large numbers of diverse orders, inefficient utilization of system resources, including space, equipment, and manpower may result in lower throughput and a large backlog of inventory requests.

In recent years, automation has improved the speed and efficiency of storing and retrieving inventory items within such systems. Human operators may be involved at various points in the automated inventory systems, for example in transferring identified inventory items to and from inventory storage structures. Various systems can be implemented to facilitate the interactions between the operators and the automated inventory systems, for example providing information to the operators regarding identified inventory items.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
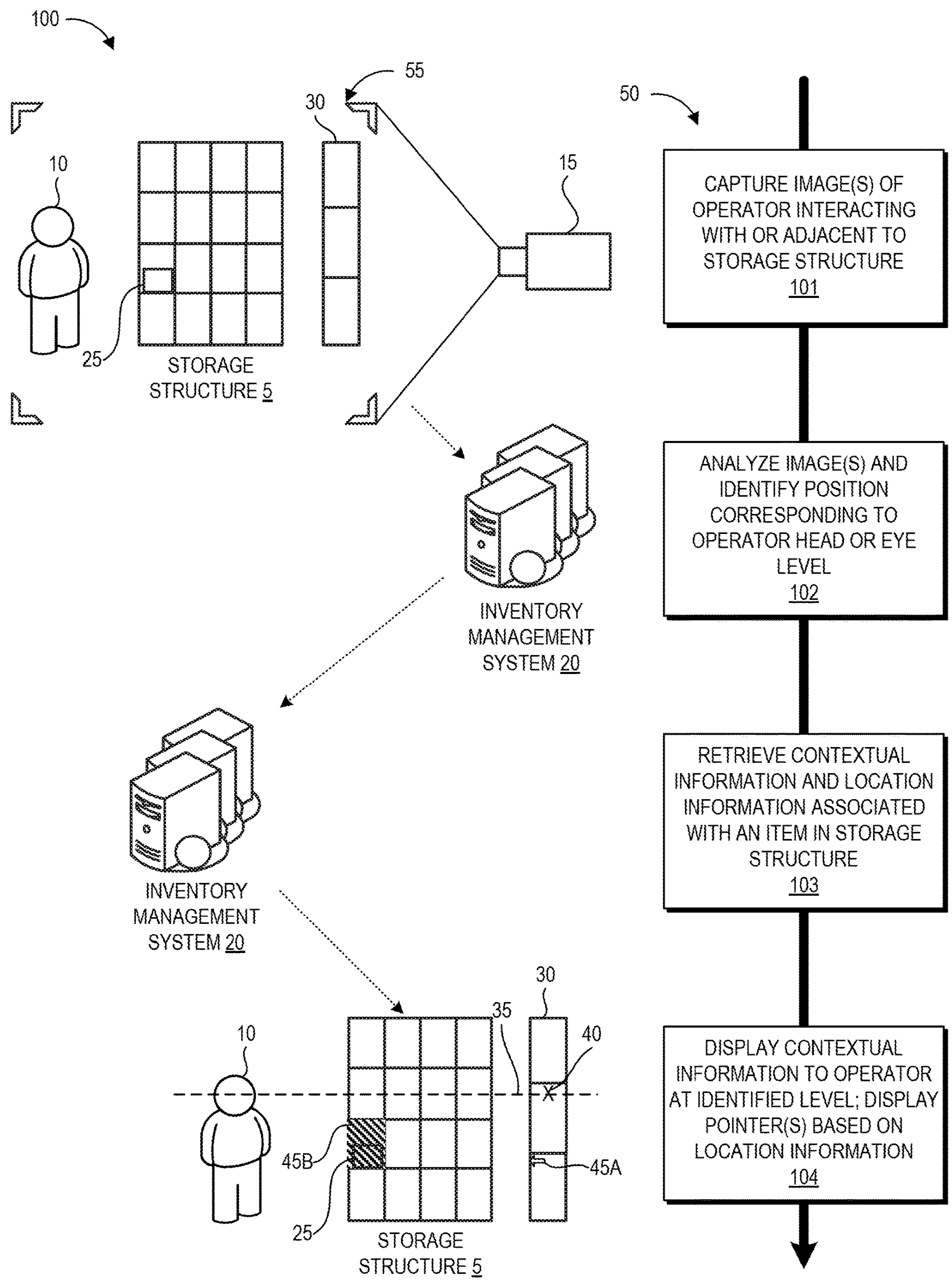
FIG. 1 illustrates an example block diagram depicting an example flow for implementing techniques relating to guiding operators through operator events using dynamically placed inventory information as described herein, according to at least one example.

Examples described herein are directed to facilitating human operator interaction with an automated or semi-automated inventory system during operator events using dynamic display placement of inventory information. Contextual information that aids an operator in identifying an item of interest in inventory storage can be presented to the operator at the beginning of an assigned task involving the item. In some embodiments, the techniques are directed to identifying position attributes including a head or eye level or angle of gaze of the operator relative to a display used to present the contextual information. The inventory system can correlate the head or eye position or gaze into a position on the display. The inventory system can display the contextual information about the inventory item to the operator on the display at the determined position. These display techniques may minimize the time it takes for the operator to locate an item within the storage structure and improve the experience and workflow of the operator.

For example, the inventory system can analyze image data or other obtained position data to identify features of an interaction between the operator and an inventory storage structure or the display. These features can include height of the operator, position of the operator (for example, crouching, standing, or elevated on a ladder), distance of the operator from the storage structure, height of the storage structure or display, angle of interaction between the operator and the storage structure or display, and other features described below. A learning algorithm can take these determined features of the interaction and translate them into position attributes including one or more of a head position, eye position, and/or angle of gaze of the operator. The gaze angle can be a tilt of the head or a line of sight of an imaged eye. The inventory system can correlate the head or eye position or gaze into a position on the display and display the contextual information about the inventory item to the operator on the display at the determined position.

Some embodiments of the inventory system can track interactions between the operator, or a number of operators, with components of the inventory system and can use this historical data to develop a model that predicts where an operator is most likely to look at the display in various inventory assignment situations. Before obtaining specific data about the position attributes of the operator, the system can display contextual information at this predicted location. The inventory system may track historical movement data (e.g., where the user first looks) on a user-by-user basis, and thus the inventory system can incorporate techniques to ascertain or receive the identity of the person it is tracking. Such techniques can include accessing an operator ID for an operator currently assigned to a particular inventory station, implementing facial recognition and image feature matching techniques, identifying an operator ID in captured image or position data, or other suitable operator tracking techniques.

The disclosed dynamic display processes, may, for example, be implemented in a semi-automated order fulfillment center in which item storage structures are automatically moved to stations at which a human operator is directed to perform a task, such as remove a particular item ordered by a customer. Each such station may include a large display provided adjacent to the location to which a storage structure is moved, and the display can be used to provide the operator with information that assists the operator in locating items within the storage structures. The displays can be a similar height to the height of the storage structure in order to provide location pointers indicating a height location of an item of interest within the storage structure. In some inventory systems this height can exceed the height of an operator, for example the height of the display can be around eight feet tall.

Locating the needed information on a large display can be time consuming for the operator and can also introduce opportunities for human error (for example, incorrectly reading information displayed at a vertically displaced distance from the eye level of the operator), both of which can increase operation costs and reduce achievable throughput. Placing information at a determined or predicted head level, eye level, or gaze angle of the operator fosters efficient and user-friendly interaction with the display rather than requiring the operator to search the large height of the display for the information. In systems implementing the disclosed dynamic inventory information display positioning, an operator can obtain the information needed for guiding interaction with a storage structure simply by glancing at an adjacent portion of the display regardless of whether the operator is crouching, standing, or has climbed on a stool or ladder.

In accordance with an embodiment, the display level can be determined based on an eye tracking system. A camera or cameras can capture images of the operator during interactions with a storage structure. The images can be provided to an eye-tracking application of a computer processor that locates the eye(s) of the operator and/or the irises of the operator in the images and/or tracks eyeball movement. The computer processor can correlate the location or movement of the eyes of the operator in the images with a position on the display, for example a vertical offset from a top or bottom of the display. The computer processor can set this position as an eye level or gaze angle of the operator and cause information to be presented at the eye level.

In accordance with an embodiment, the display level can be determined based on obtaining a silhouette of the operator and identifying a portion of the silhouette corresponding to the head of the operator. The silhouette can be obtained from image data, for example optical image data or thermal image data in various implementations. Optical image data can include visible image data such as RGB image data, infrared image data, ultraviolet image data, or any image data captured at any wavelength range or combination of wavelength ranges. A computer processor can correlate the location of the head of the operator in the images with a position on the display, set the correlated position as a head level of the operator, and cause information to be presented at the head level.

In accordance with an embodiment, the display level can be determined based on light detection and ranging ("LiDAR") data. LiDAR is a surveying technology that measures distance by illuminating a target with a laser light at ultraviolet, visible, or near infrared wavelengths. For example, a LiDAR system can be positioned adjacent to an area where an operator typically interacts with a storage structure to capture data representing the relative positioning of the operator with the storage structure. The LiDAR system can generate 2D or 3D data representing the relative positioning between the operator and the storage structure. A computer processor can receive and analyze the 2D or 3D data to identify, directly or indirectly, the head and/or eye location of the operator for correlation with a position on a display. For example, the LiDAR can capture a point cloud of data and a computer processor can identify operator hand positioning as a location of interaction and an angle of interaction between the operator and the storage structure from the point cloud data. The computer processor can identify a head position associated with the location of interaction, for example from a machine learning model, and can identify a gaze angle from the angle of interaction. The computer processor can then associate the head position and gaze angle with a position on the display. For example, if the angle of interaction indicates a positive reach angle (that is, the operator reaching above shoulder height), the computer processor can determine a vertical displacement above the head position of the operator as the position on the display based on the positive reach angle and a distance of the operator from the display. A negative reach angle (that is, the operator reaching below shoulder height) can similarly be used to determine a vertical displacement below the head position of the operator as the position on the display.

Using LiDAR or other depth sensing technologies to track operator hand positioning and basing the display position on the hand positioning can provide a number of benefits from the perspective of the operator. For example, the operator can observe how the information position on the display changes as the operator moves their hands relative to the sensing plane of the LiDAR system, thereby providing the operator with opportunity from predictability regarding where display information will be positioned in various circumstances. Further, when compared to other technologies such as eye tracking programs, hand position detection systems can detect slower or less movements, thereby providing a smoother dynamic display position to the operator.

In accordance with an embodiment, an inventory station can include a sensor positioned above a receiving zone for an inventory holder. The sensor can be aimed at a downward and/or upward angle to provide a field of focus that includes a front face of an inventory holder positioned in the receiving zone, for example to detect arm placement of an operator. The sensor can collect data about the spatial position, such as distance from the sensor, of parts of the inventory holder, inventory items supported by the inventory holder, and other nearby objects in the field of focus. A computer processor can receive the data from the sensor and determine a plane corresponding to the front face of the inventory holder positioned in the receiving zone. The computer processor can compare the position of objects detected by the sensor with the position of the plane to determine which objects (if any) are protruding through the plane. For example, the computer processor can identify data corresponding to the arm of the operator at a time of interest, such as when the arm crosses a plane associated with the front of the inventory holder or when a hand or other portion of the arm makes a particular gesture. The computer processor can use the sensor data to determine a height and a lateral position of the arm in a time window of interest. The computer processor can compare the height and the lateral position of the arm to a layout of an inventory holder to identify a bin on the inventory holder that corresponds to the arm position of the operator. The computer processor can additionally or alternatively correlate the height and the lateral position of the arm with an estimated head positioning of the operator, and can correlate the estimated head position with a position on a display.

In some embodiments, an operator can wear a hat or other headwear with a sensor that transmits the position of the head of the operator, or with a light-activated material that facilitates rapid and accurate detection of head position in captured image data. In some embodiments a wearable transmitter can be tracked by an indoor object tracking system to identify the head level of the operator. Other suitable technologies exist for obtaining information representing the operator head or eye position, for example structured light, optical time-of-flight, ultrasonic ranging, stereoscopic imaging, radar, and so forth. The disclosed position information systems and techniques can be used either alone or in combination with one another.

Information presented at the determined level on the display can be vertically centered at the determined level, can have an upper alignment with the determined level, can have a lower alignment with the determined level, or otherwise positioned so that a portion of the information is displayed at the determined level. The described correspondences and data associations can be generated via a machine learning model in some embodiments. For example, the inventory system can track interactions of one or more operators with one or more storage structures to identify features of the interactions. Using the features of the interactions, the system can generate one or more machine learning models that determine a position on a display corresponding to a gaze angle, head level, or eye level of an operator given features of a present interaction. For instance, the system can cluster the features according to a clustering process (e.g., k-means clustering), and can determine based on identified features in image or position data, a particular location on the display that best comports with the user's head, eye, or gaze positioning.

A computer processor can update the determined level periodically based on computing resource and/or operator efficiency calculations, preferences set by the operator, or a combination thereof. For example, the computer processor can update the determined level each time new information is identified for display to the operator, periodically at regular or irregular intervals, upon detection of specific events for example the operator looking at the display, or continuously. As the determined level is updated, the computer processor can cause the position of the displayed information to be updated accordingly on the display. The level may be updated, for example, as the operator moves from task to task within an inventor station environment, for example as the operator moves a physical item between an inventory storage structure and a temporary storage structure in a holding area. Some embodiments may track the number, location, and frequency of operator glances at the display to identify a position where the operator typically looks first in different inventory situations and can set this position as a default display position for that operator.

In some implementations, two types of information can be provided on the display when an operator initially engages a storage structure to locate an item contained in the storage structure. A first type of information can be contextual information that is provided to enable the operator to locate the item within the display. Contextual information can include item name, item number, an image of the item and/or its packaging, row and column information representing the position of the item in the storage structure, or other visual or textual information identifying the item and/or its location in the storage structure. A second type of information can be location identifying information, for example an arrow or other position indicator provided on the display to indicate a height of the item within the storage structure or a projected highlighting of a portion or bin of the storage structure that contains the item. Contextual information can assist an operator in identifying what she is seeking within a storage structure. The contextual information display level can be dynamically adjusted using the techniques described herein to accommodate variations in operator height between various operators and to accommodate variations in individual operator eye level during interaction of the operator with the portions of the storage structure. This dynamic positioning can minimize the time typically taken by an operator to locate the contextual information on the display. The location information can be displayed at the level on the display or position on the storage structure corresponding to the position of the item within the storage structure. Location information can assist an operator in rapidly locating the desired item within the storage structure.

Correlating position attributes of the operator with a display position can be performed in some embodiments by a learning algorithm. The learning algorithm can be a decision tree, a random forest, linear regression, or any other classifier.

Various aspects of the disclosure will now be described with regard to certain examples and embodiments, which are intended to illustrate but not limit the disclosure. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiment being described.

Example Dynamic Inventory Information Placement Systems and Techniques

FIG. 1 illustrates an example block diagram 100 depicting an example process 50 for implementing techniques relating to guiding operators through operator events using dynamically placed inventory information as described herein.

The diagram 100 illustrates a human operator 10 that interacts with an inventory item 25 and a storage structure 5. The diagram 100 also includes an image capture device 15 that is configured to capture one or more images and an inventory management system 20 that is configured to process the images and identify operator events, for example an initial or updated head or eye level of the operator 10.

The process 50 may begin at 101 by the image capture device 15 capturing one or more images 3 of the operator 10 and optionally of the storage structure 5 including the inventory item 25. In some examples, the one or more images 3 are captured before, during, and/or after the time when the operator 10 interacts with the inventory item 25 and/or the storage structure 5. The one or more images 3 may be any of the images described herein for obtaining data usable to identify head and/or eye location of the operator 10, and can be still images or video.

The images 3 can be provided to the inventory management system 20. The inventory management system 20 can be configured to manage inventory items stored in a warehouse, processed at a processing facility, and the like. In some examples, the inventory management system 20 can be configured to manage the operation of the image capture device 15 and any other device related to implementing the techniques described herein. For example, the inventory management system 20 can instruct the image capture device 15 to capture the images 3.

At 102, the inventory management system 20 can analyze the one or more images 3 to identify the location of the head and/or eye(s) of the operator 10 in the images 3. The inventory management system 20 can use the identified location to identify a position on display 30 that corresponds to the determined head and/or eye level. The position can be, in some embodiments, a vertical offset from a top or bottom of the display, a y-coordinate representing a height on a display 30 being x pixels wide and y pixels tall, or another indication of a height level associated with display 30.

At 103 the inventory management system 20 can retrieve contextual information and location information associated with item 25 within the storage structure 5. As described above, the contextual information can assist the operator 10 with determining which item the operator is seeking within the storage structure 5, and the location information can be used provide visual cues to assist the operator with locating the desired item more rapidly.

At 104 the inventory management system 20 can cause the display of the contextual information 40 at the position on display 30 corresponding to the determined eye or head level 35 or gaze angle of the operator. The inventory management system 20 can also use historical data representing past interactions between the operator and inventory system components to determine where the operator typically looks first, and the determined eye or head level 35 or gaze angle can be based partly on where the operator typically looks first. The inventory management system 20 can cause optionally display of one or more of graphical pointer 45A at the height of the item 25 or a bin containing the item 25 within the storage structure 5 and a highlighting pointer 45B projected onto the storage structure 5 over the bin containing the item 25.

Figure 2:
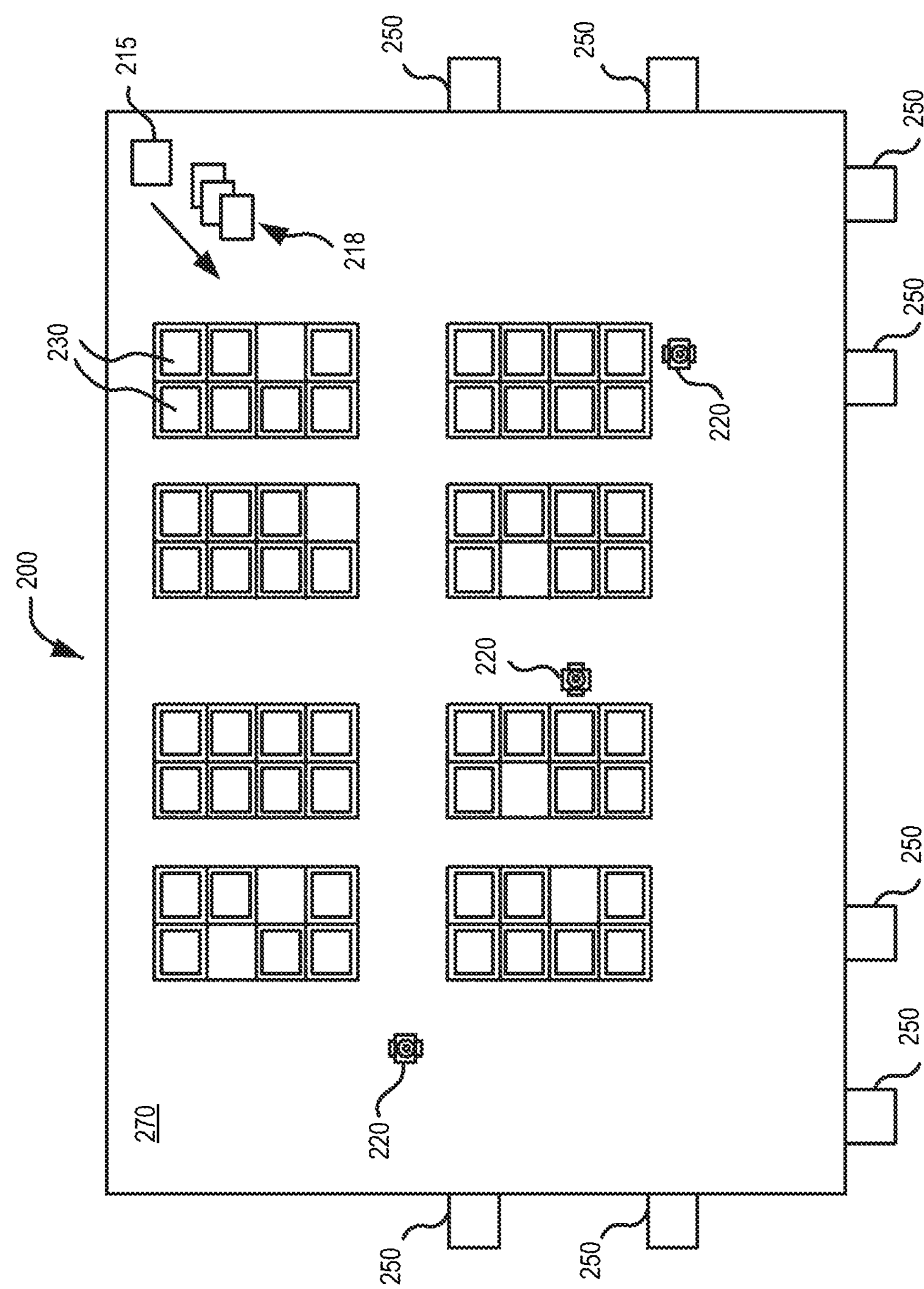
FIG. 2 illustrates components of an inventory system according to at least one example.

FIG. 2 illustrates components of an inventory system 200. Inventory system 200 includes a management module 215, one or more mobile drive units 220, one or more inventory storage structures 230, and one or more inventory stations 250. Each storage structure 230 stores one or more types of inventory items. Mobile drive units 220 transport storage structures 230 between points within a workspace 270 in response to commands communicated by management module 215. The inventory system 200 can utilize mobile drive units 220 to facilitate strategic operator interactions with inventory items passing through the inventory system 200. For example, the mobile drive units 220 can move storage structures 230 loaded with items between different stations 250 at which operators may interact with inventory items and prepare the inventory items for subsequent phases in the inventory system 200. As a result, inventory system 200 is capable of moving inventory items between locations within workspace 270 to facilitate the entry, processing, and/or removal of inventory items from inventory system 200 and the completion of other tasks involving inventory items.

Management module 215 assigns tasks to appropriate components of inventory system 200 and coordinates operation of the various components in completing the tasks. Some of these task assignments 218 can include the dynamic information positioning techniques described herein. These tasks may relate not only to the movement and processing of inventory items, but also to the management and maintenance of the components of inventory system 200. For example, management module 215 may assign portions of workspace 270 as parking spaces for mobile drive units 220, the scheduled recharge or replacement of mobile drive unit batteries, the storage of empty storage structures 230, or any other operations associated with the functionality supported by inventory system 200 and its various components. Management module 215 may select components of inventory system 200 to perform these tasks and communicate appropriate commands and/or data to the selected components to facilitate completion of these operations.

Although shown in FIG. 2 as a single, discrete component, management module 215 may represent multiple components and may represent or include portions of mobile drive units 220 or other elements of inventory system 200. As a result, any or all of the interaction between a particular mobile drive unit 220 and management module 215 may, in particular embodiments, represent peer-to-peer communication between that mobile drive unit 220 and one or more other mobile drive units 220.

Mobile drive units 220 move storage structures 230 between locations within workspace 270. Mobile drive units 220 may represent any devices or components appropriate for use in inventory system 200 based on the characteristics and configuration of storage structures 230 and/or other elements of inventory system 200. In a particular embodiment of inventory system 200, the mobile drive units 220 are independent, self-powered devices configured to freely move about workspace 270. In alternative embodiments, mobile drive units 220 are elements of a tracked inventory system configured to move storage structure 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory system 200 mobile drive units 220 may be configured to utilize alternative conveyance equipment to move within workspace 270 and/or between separate portions of workspace 270.

Additionally, mobile drive units 220 may be capable of communicating with management module 215 to receive information identifying selected storage structures 230, transmit the locations of mobile drive units 220, or exchange any other suitable information to be 220 used by management module 215 or mobile drive units 220 during operation. Mobile drive units 220 may communicate with management module 215 wirelessly, using wired connections between mobile drive units 220 and management module 215, and/or in any other appropriate manner. As one example, particular embodiments of mobile drive unit 220 may communicate with management module 215 and/or with one another using 802.11, Bluetooth, or Infrared Data Association (IrDA) standards, or any other appropriate wireless communication protocol. As another example, in a tracked inventory system 200, tracks or other guidance elements upon which mobile drive units 220 move may be wired to facilitate communication between mobile drive units 220 and other components of inventory system 200. Furthermore, as noted above, management module 215 may include components of individual mobile drive units 220. In general, mobile drive units 220 may be powered, propelled, and controlled in any manner appropriate based on the configuration and characteristics of inventory system 200.

Storage structures 230 store inventory items. In a particular embodiment, storage structures 230 include multiple storage bins with each storage bin capable of holding one or more types of inventory items. Storage structures 230 are capable of being carried, rolled, and/or otherwise moved by mobile drive units 220. In particular embodiments, storage structure 230 may provide additional propulsion to supplement that provided by mobile drive unit 220 when moving storage structure 230. In some examples, each storage structure 230 may include a plurality of faces, and each bin may be accessible through one or more faces of the storage structure 230. For example, in a particular embodiment, storage structure 230 includes four faces. In such an embodiment, bins located at a corner of two faces may be accessible through either of those two faces, while each of the other bins is accessible through an opening in one of the four faces. Mobile drive unit 220 may be configured to rotate storage structure 230 at appropriate times to present a particular face and the bins associated with that face to an operator or other components of inventory system 200. Additionally, in particular embodiments, inventory items may also hang from hooks or bars (not shown) within or on storage structure 230. In general, storage structure 230 may store inventory items in any appropriate manner within storage structure 230 and/or on the external surface of storage structure 230.

Inventory items be any object or objects suitable for storage, retrieval, and/or processing in an automated inventory system 200. For the purposes of this description, "inventory items" may be any one or more objects of a particular type that are stored in inventory system 200. As one example, inventory system 200 may be part of a mail order warehouse facility, and the inventory items may be merchandise items (physical products) stored in the warehouse facility. During operation, mobile drive units 220 may retrieve storage structures 230 containing one or more inventory items requested in an order to be packed for delivery to a customer or storage structures 230 carrying pallets containing aggregated collections of inventory items for shipment. Moreover, in particular embodiments of inventory system 200, boxes containing completed orders may themselves represent inventory items.

Figure 3A:
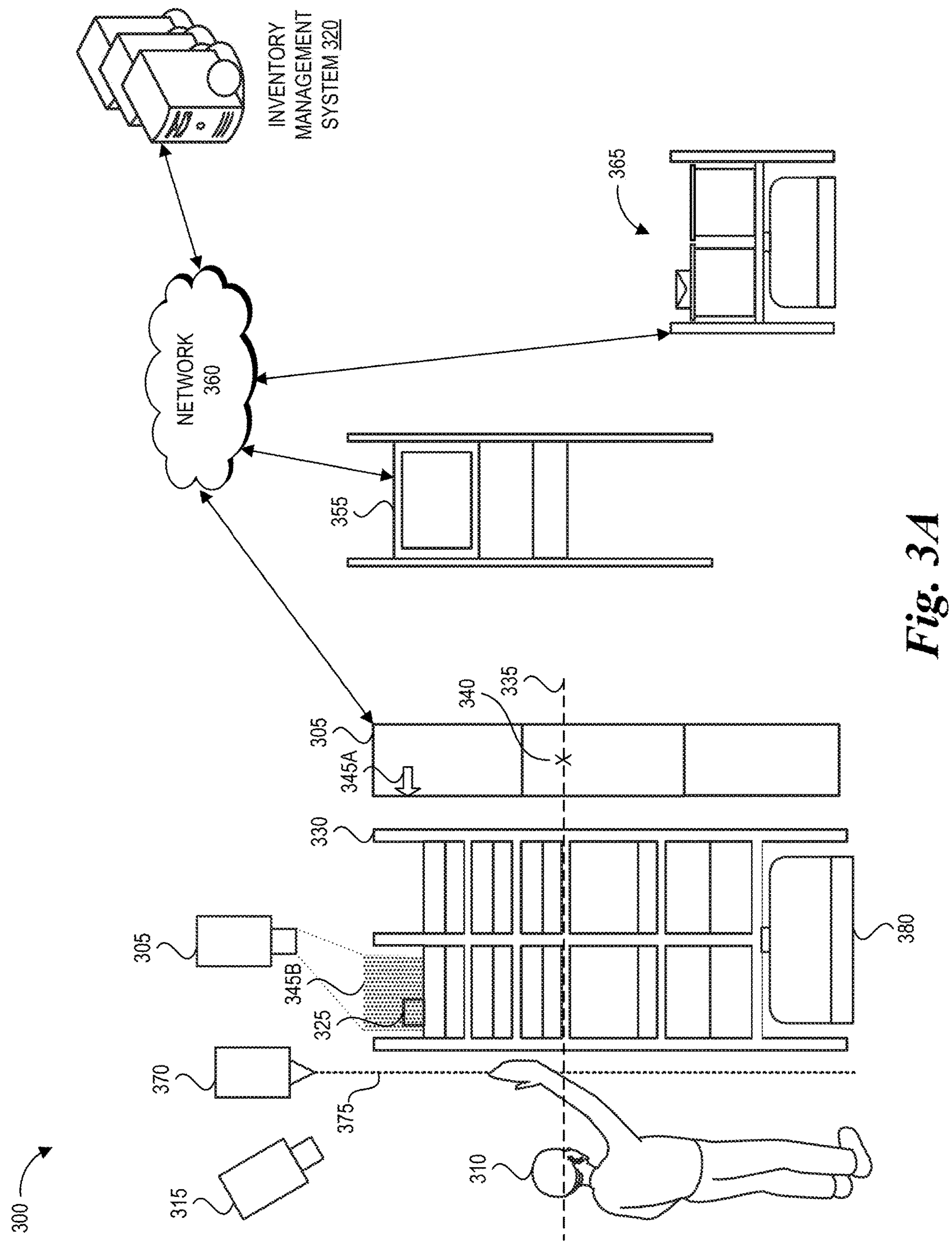
FIGS. 3A-3C illustrate an example inventory station at which techniques relating to dynamically placed inventory information as described herein can be implemented, in accordance with at least one example.
Figure 3B:
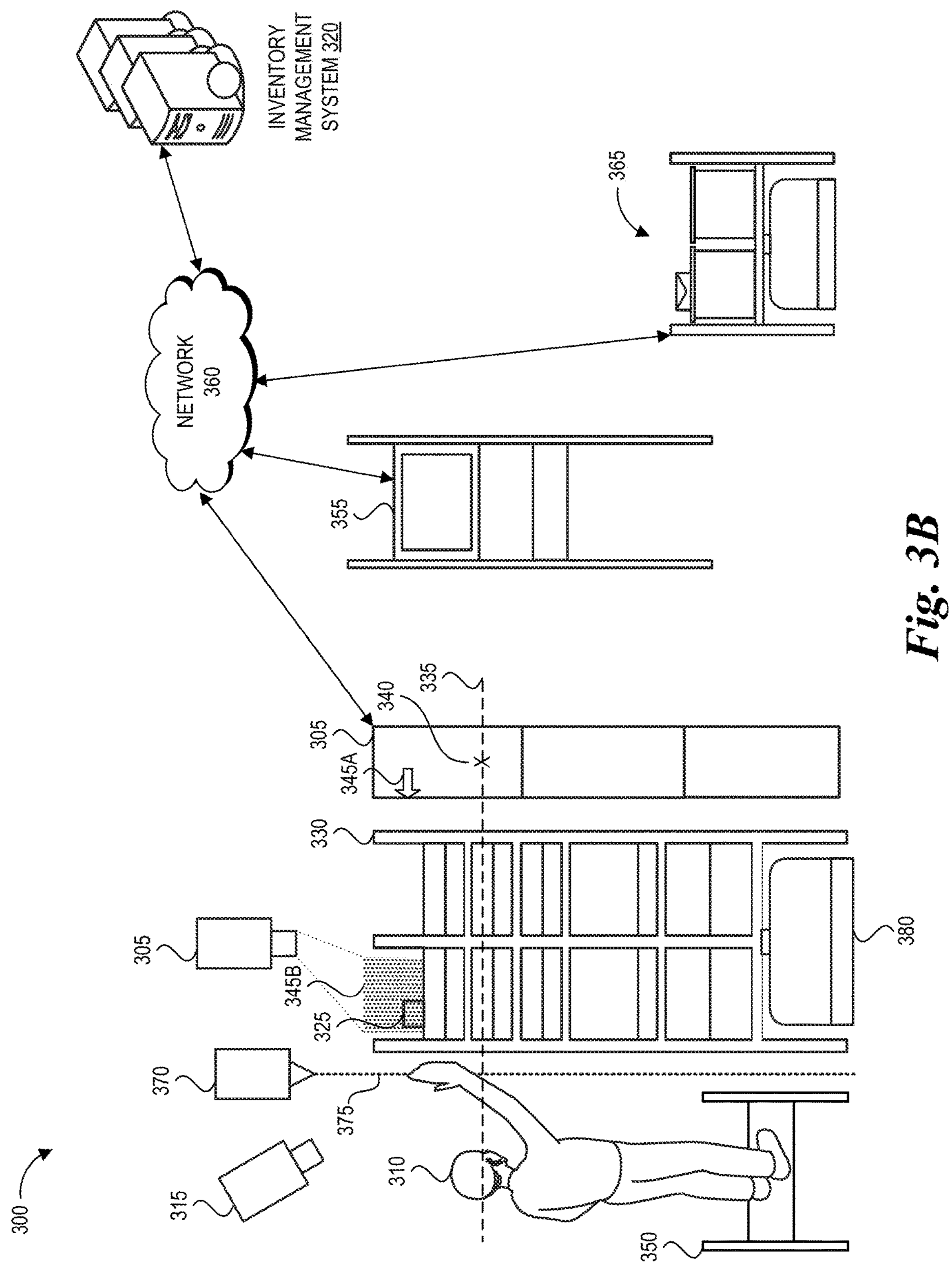
Figure 3C:
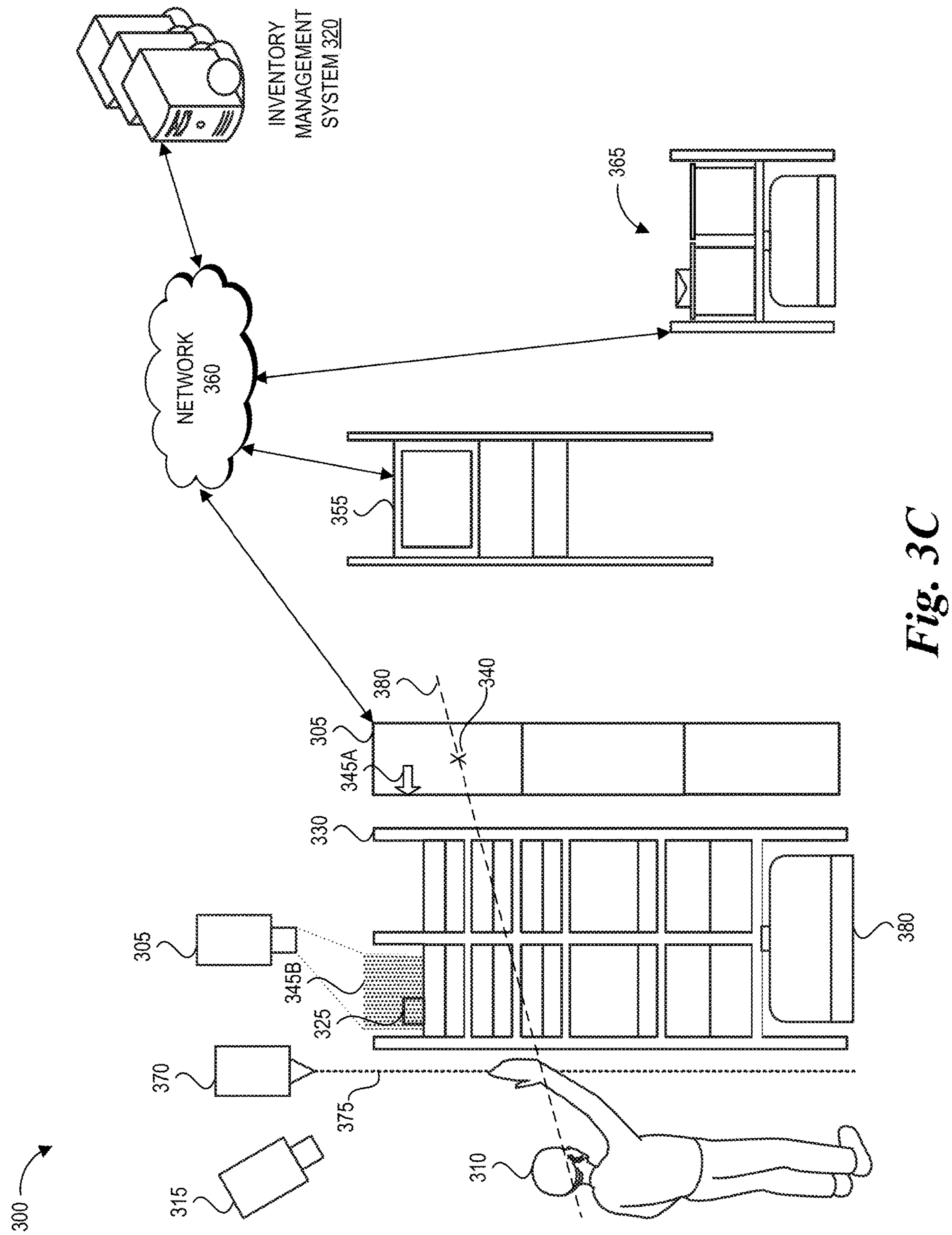

In particular embodiments, inventory system 200 may also include one or more inventory stations 250. Inventory stations 250 represent locations designated for the completion of particular tasks involving inventory items. Such tasks may include the removal of inventory items from storage structures 230, the introduction of inventory items into storage structures 230, the counting of inventory items in storage structures 230, the decomposition of inventory items (e.g. from pallet- or case-sized groups to individual inventory items), the consolidation of inventory items between storage structures 230, and/or the processing or handling of inventory items in any other suitable manner. In particular embodiments, inventory stations 250 may just represent the physical locations where a particular task involving inventory items can be completed within workspace 270. In alternative embodiments, inventory stations 250 may represent both the physical location and also any appropriate equipment for processing or handling inventory items, such as the dynamically configurable displays described herein, scanners for monitoring the flow of inventory items in and out of inventory system 200, communication interfaces for communicating with management module 215, and/or any other suitable components. An example configuration for an inventory station 250 is shown in FIGS. 3A-3C. Inventory stations 250 may be controlled, entirely or in part, by human operators or may be fully automated. Moreover, the human or automated operators of inventory stations 250 may be capable of performing certain tasks to inventory items, such as packing, counting, or transferring inventory items, as part of the operation of inventory system 200. In some examples, such human or automated operators may be considered item manipulators.

Workspace 270 represents an area associated with inventory system 200 in which mobile drive units 220 can move and/or storage structures 230 can be stored. For example, workspace 270 may represent all or part of the floor of a mail-order warehouse in which inventory system 200 operates. Although FIG. 2 shows, for the purposes of illustration, an embodiment of inventory system 200 in which workspace 270 includes a fixed, predetermined, and finite physical space, particular embodiments of inventory system 200 may include mobile drive units 220 and storage structures 230 that are configured to operate within a workspace 270 that is of variable dimensions and/or an arbitrary geometry. While FIG. 2 illustrates a particular embodiment of inventory system 200 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile drive units 220, storage structures 230, inventory stations 250 and other components of inventory system 200. Depending on the component and the task to be completed, a particular task assignment 218 may identify locations, components, and/or actions associated with the corresponding task and/or any other appropriate information to be used by the relevant component in completing the assigned task. For example, a task assignment can include provision of inventory information to a display at an inventory station 250 for dynamic placement at the head or eye level of the operator as described herein.

In particular embodiments, management module 215 generates task assignments 218 based, in part, on inventory requests that management module 215 receives from other components of inventory system 200 and/or from external components in communication with management module 215. These inventory requests identify particular operations to be completed involving inventory items stored or to be stored within inventory system 200 and may represent communication of any suitable form. For example, in particular embodiments, an inventory request may represent a shipping order specifying particular inventory items that have been purchased by a customer and that are to be retrieved from inventory system 200 for shipment to the customer. Management module 215 may also generate task assignments 218 independently of such inventory requests, as part of the overall management and maintenance of inventory system 200. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory system 200. Inventory information associated with the task assignment 218 can include contextual information representing identification details of the inventory items and location information representing the location of the inventory items in the workspace 270 and/or a particular storage structure 230. After generating one or more task assignments 218, management module 215 transmits the generated task assignments 218 to appropriate components for completion of the corresponding task. The relevant components then execute their assigned tasks.

With respect to mobile drive units 220 specifically, management module 215 may, in particular embodiments, communicate task assignments 218 to selected mobile drive units 220 that identify one or more destinations for the selected mobile drive units 220. Management module 215 may select a mobile drive unit 220 to assign the relevant task based on the location or state of the selected mobile drive unit 220, an indication that the selected mobile drive unit 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an storage structure 230 to be retrieved, an inventory station 250 to be visited, a storage location where the mobile drive unit 220 should park until receiving another task, or a location associated with any other task appropriate based on the configuration, characteristics, and/or state of inventory system 200, as a whole, or individual components of inventory system 200. For example, in particular embodiments, such decisions may be based on the popularity of particular inventory items, the staffing of a particular inventory station 250, the tasks currently assigned to a particular mobile drive unit 220, and/or any other appropriate considerations.

As part of completing these tasks, mobile drive units 220 may dock with and transport storage structures 230 within workspace 270. Mobile drive units 220 may dock with storage structures 230 by connecting to, lifting, and/or otherwise interacting with storage structures 230 in any other suitable manner so that, when docked, mobile drive units 220 are coupled to and/or support storage structures 230 and can move storage structures 230 within workspace 270. In particular embodiments, mobile drive units 220 represent all or portions of storage structures 230. In such embodiments, mobile drive units 220 may not dock with storage structures 230 before transporting storage structures 230 and/or mobile drive units 220 may each remain continually docked with or structurally incorporated with a particular storage structure 230.

While the appropriate components of inventory system 200 complete assigned tasks, management module 215 may interact with the relevant components to ensure the efficient use of space, equipment, manpower, and other resources available to inventory system 200. As one specific example of such interaction, management module 215 is responsible, in particular embodiments, for planning the paths mobile drive units 220 take when moving within workspace 270 and for allocating use of a particular portion of workspace 270 to a particular mobile drive unit 220 for purposes of completing an assigned task. In such embodiments, mobile drive units 220 may, in response to being assigned a task, request a path to a particular destination associated with the task. Moreover, while the description below focuses on one or more embodiments in which mobile drive unit 220 requests paths from management module 215, mobile drive unit 220 may, in alternative embodiments, generate its own paths.

Components of inventory system 200 may provide information to management module 215 regarding their current state, other components of inventory system 200 with which they are interacting, and/or other conditions relevant to the operation of inventory system 200. This may allow management module 215 to utilize feedback from the relevant components to update algorithm parameters, adjust policies, or otherwise modify its decision-making to respond to changes in operating conditions or the occurrence of particular events. For example, sensing devices positioned at inventory stations 250 can provide data (for example visual image data, thermal image data, LiDAR data, or other position-indicating data) to the management module 215 representing the head or eye positioning of an operator at the inventory station 250. In some examples this data can be analyzed by the management module 215 to determine the head or eye level of the operator, correlate the determined level with a position on a display of the inventory station 250, and then the position can be output to the display with the inventory information for display.

In addition, while management module 215 may be configured to manage various aspects of the operation of the components of inventory system 200, in particular embodiments, the components themselves may also be responsible for decision-making relating to certain aspects of their operation, thereby reducing the processing load on management module 215. In some examples, localized computing resources specific to each inventory station 250 or to a grouping of inventory stations 250 can analyze the position-indicating data to identify the dynamic display position.

Thus, based on its knowledge of the location, current state, and/or other characteristics of the various components of inventory system 200 and an awareness of all the tasks currently being completed, management module 215 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 200 may be able to support a number of techniques for efficiently executing various aspects of the operation of inventory system 200. As a result, particular embodiments of management module 215 may, by implementing one or more management techniques described herein, enhance the efficiency of inventory system 200 and/or provide other operational benefits.

FIGS. 3A-3C illustrate an example inventory station 300 at which techniques relating to dynamically placed inventory information as described herein can be implemented on a display 305. FIG. 3A illustrates a configuration of the display 305 for a determined eye level 335 of an operator 310 in a standing position, FIG. 3B illustrates a configuration of the display 305 for a determined eye level 335 of the operator 310 in an elevated position on ladder 350, and FIG. 3C illustrates a configuration of the display 305 for a determined gaze angle 380 of an operator 310 in a standing position. In some embodiments the display 305 can smoothly transition between any of the configurations shown in FIGS. 3A-3C, for example between the configurations shown in FIGS. 3A and 3B as the operator climbs onto ladder 350. A smooth transition can be facilitated for example by having noise-filtering techniques applied to generate a linear movement vector based on changes in the operator's eye or head level during the climbing. In another embodiment the display 305 can wait to transition between any of the configurations shown in FIGS. 3A-3C until the operator's eye or head level or gaze angle stabilizes, for instance when the operator 310 has finished climbing onto ladder 350. In another embodiment display 305 can transition between any of the configurations shown in FIGS. 3A-3C upon receipt of new or updated information for presentation on display 305.

The display 205 can be a fixed component of the inventory station 300 positioned adjacent to a location at the inventory station 300 to which the movable storage structures 330 are moved. In other embodiments each storage structure 330 can include one or more displays 205 that can be moved together with the storage structure 330, and thus a fixed display at the inventory station 300 can be omitted in such embodiments. In some embodiments these heights can have a height between five feet and ten feet, and more preferably between seven feet and nine feet. The height of the display can be scalable based on the requirements of the inventory system relating to the storage structure height, and can be selected to match the storage structure height.

The inventory station 300 can include the storage structure 330 coupled to the mobile drive unit 380. The mobile drive unit 380 can be instructed to present any one of a plurality of sides of the storage structure 330 to the operator 310. The inventory station 300 can also include a temporary storage location 365. The temporary storage location 365 can be used to store inventory for a short period of time, for example prior to shipment, inspection, or stocking in the storage structure 330. Inventory station also includes one or more sensors 370, 315, a projector 305, and a local computing device 355 having a network communication device for communicating via network 360 with inventory management system 320 and display 305. The temporary storage location 365 can communicate with the inventory management system 320 via the network 360, for example to indicate when an item has been moved to a bin or when the operator 310 indicates that an assigned task is complete. Though not illustrated, the inventory station 300 can include one or more user devices that enable operator 310 to record her interactions with the inventory item 325. For example, interaction include scanning the inventory item 325 and scanning the particular compartment of the storage structure 330 in which the inventory item 325 was placed.

In some implementations, the inventory management system 320 can dynamically update the position of appropriate contextual information displayed to the operator as they switch between different tasks or move to different positions within the inventory station 300. For example, inventory management system 320 can track operator interactions with different types of storage structures, for example mobile storage structure 330 and temporary storage structures in temporary storage location 365. The inventory management system 320 can use these tracked interactions to determine where the operator typically looks first when performing tasks in different areas of the inventory station 300. As the operator moves item 325 between mobile storage structure 330 and temporary storage structures in temporary storage location 365 the inventory management system 320 can update the position of contextual information 340 on display 305. The updated position can be based at least on one or both of the location where the operator looks first and current position attributes of the operator. Such position attributes can include the location of the head and/or eye(s) of the operator, gaze angle of the operator, movement of the irises of the operator, the posture of the operator (for example, kneeling, standing, or elevated on a ladder), the reach angle of the operator (for example reaching upward or downward relative to the shoulder level of the operator), distance of the operator from a storage structure or display, position data from a wearable sensor on the body of the operator, and positioning of any ladders or stools used by the operator to access items in the storage structure, as sensed by the various devices described herein.

The inventory station 300 can include the storage structure 330 coupled to the mobile drive unit 380. Mobile drive units 380 can be motorized or moved by a motorized track system for moving storage structures 330 from location to location within the inventory environment. The mobile drive unit 380 can be instructed to present any one of a plurality of sides of the storage structure 330 to the operator 310. The inventory station 300 can also include a temporary storage location 365. The temporary storage location 365 can be used to store inventory for a short period of time, for example prior to shipment, inspection, or stocking in the storage structure 330. The temporary storage location 365 can include indicators for providing visual cues to the operator 310 regarding which bin is intended for an item and input devices, for example buttons, for input from the operator 310 after placing an item in a designated bin.

The operator 310 can utilize the local computing device 355 to perform techniques relating to interacting with inventory (e.g., stowing and removing items) at the inventory station 300. For example, information can be presented on display 305 that instructs the operator 310 to retrieve the inventory item 325 from the storage structure 330 and place the inventory item 325 in the temporary storage location 365, or vice versa. The information can include contextual information 340 displayed at the determined eye or head level 335 of the operator 310 and optionally one or more position location indicators 345A, 345B. Position indicators can include, for example, an arrow 345A or other graphical pointing indicator displayed on the display 305 at a height of the item 325 in the storage structure 330 and/or a projected highlighting 345B over the compartment or region of storage structure 330 storing the item 325. To this effect, the inventory station 300 can include a projector 305 for projecting information onto the storage structure 330. The color of arrow 345A can be changed to correspond to different rows in the storage structure 330, and the rows in the storage structure 330 can be colored accordingly to facilitate rapid recognition by the operator 310 of the location of the desired item 325.

The typical positions occupied by operator 310 when interacting with storage structure 330 place the operator 310 in close proximity with the display 305. As such, repeatedly scanning the height of the display for needed information can add up to amount to significant time during a shift of the operator, thereby reducing operator efficiency and creating a potential for neck strain. The disclosed dynamic information placement techniques alleviate these problems by allowing the operator 310 to simply glance sideways toward the display 305 to view displayed information regardless of the position of the operator 310 as he or she interacts with the storage structure 330.

The display 335 may comprise an LCD, LED, or OLED screen (or multiple such screens), and may implement touch sensitive technologies. As illustrated, the display 335 may be comprised of multiple portions. Other embodiments may comprise a single, unified display surface. In some embodiments the display has a built-in network connectivity device for communicating with local computing device 355 and/or inventory management system 320 via network 360. In some embodiments the local computing device 355 may be integrated into display 305 such that the display 305 includes one or more computer processors for performing the dynamic information positioning techniques described herein and is a local processing component of the inventory management system 320. In some examples a color of the display can indicate a status of the interactions between operator 310 and the item 325. For example, the display 305 or a portion thereof can be blue when waiting for the operator 310 to act, red if the inventory management system 320 detects an error, and green when an assigned task has been successfully completed. Other status indications are possible within the scope of this disclosure.

The position detection device 370 may be any suitable device configured to detect a position of object with respect to itself, and can be positioned for detecting an arm position of an operator 310 relative to a storage structure 330 according to some embodiments. For example, the position detecting device 370 may be positioned above a space that is expected to be occupied by a storage structure 330 when brought by a mobile drive unit as described above. The position detection device 370 may be configured to generate a light plane 375 that is approximately parallel to a face of the storage structure 330 to detect positions where objects intersect (e.g., pass through) the light plane 375 (for example, a hand of the operator 310 reaching towards the inventory item 325). In some examples, the position detection device 370 may also detect other information about the objects that intersect the light plane 375. Such other information may indicate dimensional characteristics of the objects. In some examples, the position detection device 370 may be a light detection and ranging (LiDAR) device or other suitable laser scanner or 3-dimensional scanner. The position detection device 370 can be mounted in any suitable manner. For example, the position detection device 370 can be mounted above the operator 310 and/or to the side of the operator 310 in a frame or other suitable structure. In some embodiments, an additional sensor is provided at a different orientation and/or position from the position detection device 370, such as below the storage structure 330 so as to provide additional information about the position of the arm if the operator 310 is bending over and obstructing the view of the arm from the position detection device 370.

Information received from the position detection device 370 may indicate an intersection position on the light plane 375. This information can be used by the local computing device 355, inventory management system 320, or other suitable device to correlate the intersection position with one or more compartments of the storage structure 330 and/or a head or eye level of the operator. The local computing device 355 and/or inventory management system 320 can convert data from the position detection device 370 into spatial data regarding the spatial position of objects detected by the position detection device 370, recognize data corresponding to an arm of the operator 310, determine a spatial position and orientation corresponding to the arm (for example by identifying data points or a 2D shape of continuous data points corresponding to the arm), extrapolate a level of the head of the operator 310, and correlate that extrapolated head level with a position on the display 305. Some or all of these functions can be implemented using machine learning techniques. For example, a 2D shape of the data points can be circular or elliptical based on whether the operator is reaching forward, upward, or downward. The width and height (the geometric parameters) of the 2D shape representing the operator interaction and the time or duration of the interaction can be used to identify operator arm position in some embodiments. The shape of the data points can be used to determine the body positioning of the operator. In some embodiments, operator body parameters such as height, arm length, arm circumferences, and the like can be input for tailoring the head level determination to specific operators. The operator body parameters, 2D shape parameters, and other interaction parameters can be referred to as features of the interaction. A learning algorithm can take the determined features of the interaction and translate this into a head position.

Some implementations can incorporate machine learning techniques to learn, based on historical data regarding user head level, eye level, or gaze angle during specific tasks, in specific locations, and/or at specific times, where a particular operator is likely to look first in a given situation. The system can also refine the determined head levels based, for example, on operator feedback regarding accuracy of the determined head level. Such feedback can be provided in some examples by an operator tapping on a touch-sensitive implementation of the display 305 at an actual head level when the information is displayed elsewhere. The local computing device 355 and/or inventory management system 320 can adaptively learn where to display information to an operator or a group of operators by monitoring operator productivity (for example, number of tasks completed per hour) and/or instances of operator error.

As described above, the image capture device 315 can be configured to capture one or more images of the operator 310 and/or storage structure 330. The local computing device 355 and/or inventory management system 320 can receive the image(s), analyze the image(s) to identify the head or eye position of the operator 310, and correlate the identified position with the level 335 for display of information on the display 305. In some examples, the image capture device 315 may include an infrared, visible light, or ultraviolet sensing camera. In some examples, the image capture device 315 may include a thermal imaging device or other suitable device capable of capturing one or more thermal images using infrared radiation. Images captured using the thermal imaging device may have regions that represent a range of temperatures. In some examples, the images may be monochromatic and/or may be mapped to a range of colors. In some examples, the image capture device 315 may include an image capture device configured with the appropriate filters to detect light-activated material. For example, the light-activated material may emit electromagnetic radiation at any suitable frequency along the electromagnetic spectrum, and the image capture device 315 may be configured to detect the emission of the electromagnetic radiation. In some examples, the light-activated material may emit electromagnetic radiation at frequencies between near ultraviolet to far infrared, which can include frequencies that are visible to humans. Examples of the light-activated material may include, but are not limited to, zinc sulfide, strontium aluminate, calcium sulfide, alkaline earth metal silicate, radium, promethium, tritium, and other materials having phosphorescent and/or luminescent characteristics. As described herein, the light-activated materials may be incorporated into headwear of the operator 310 to facilitate rapid and accurate locating of the head of the operator.

In some examples, the techniques described herein may be implemented at the inventory station 300 using variations of storage structures other than the storage structure 330. For example, as part of an item removal process, the operator 310 may interact with a storage structure to remove one or more items from the storage structure and place each of the items in one of a plurality of inventory containers in temporary storage area 365. In some examples, the image capture device 315 and/or position detecting device 814 may be configured to capture one or more images at different points in time while the operator 310 retrieves the items from storage structure 330 places the items in the inventory containers. Using the techniques described herein, the head or eye level of the operator may be determined and/or confirmed and used for dynamically displaying information 340, for example contextual information, at the determined level.

Figure 4:
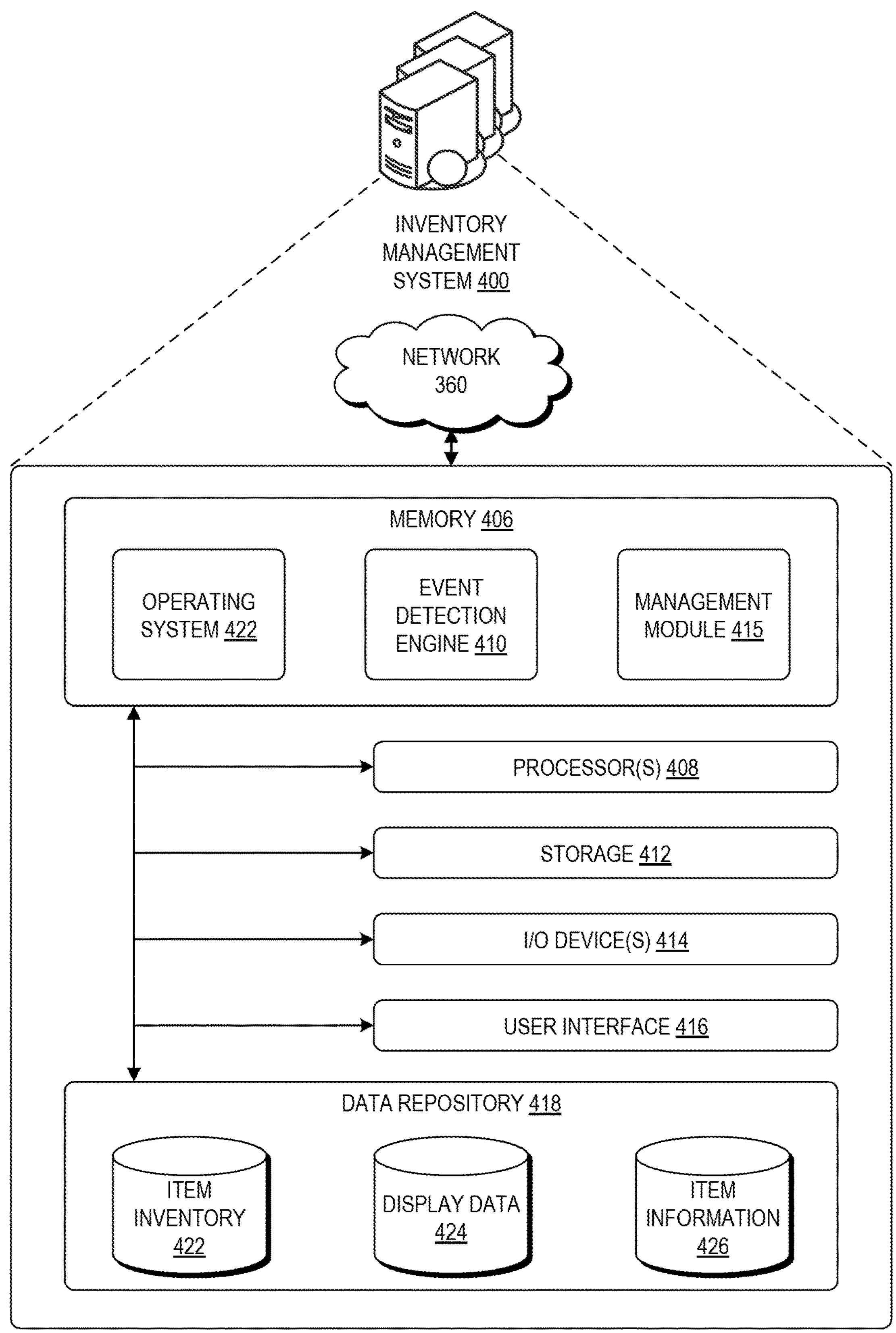
FIG. 4 an example architecture or system for implementing techniques relating to dynamically placed inventory information as described herein, according to at least one example.

FIG. 4 an example architecture or system for implementing techniques relating to dynamically positioning inventory information as described herein, according to at least one example. The architecture of the inventory system 400 may include a memory 406 storing an operating system 422, event detection engine 410, and management module 415, which can be in direct communication with one another or distributed among computing devices within an inventory system and in communication with each other via one or more network(s) 360. The network 360 can include any appropriate network, including an intranet, the Internet, a cellular network, a local area network or any other such network or combination thereof. Components used for the architecture may depend at least in part upon the type of network and/or environment selected. The network 360 may be proprietary or non-proprietary.

The inventory management system 400 may include one or more computers, perhaps arranged in a cluster of servers or as a server farm. The memory and processors that make up these computers may be located within one computer or distributed throughout many computers as detailed herein. These servers may be configured to manage inventory of the inventory system and other systems. For example, the inventory management system 400 may be configured to manage inventory offered in connection with an electronic marketplace. In this example, the inventory management system 400 may manage inventory while it is located at a variety of different locations (e.g., warehouses, shipping centers, and other locations). This may also involve end-to-end tracking of inventory. In some examples, the techniques described herein may enable the inventory management system 400 to manage the inventory of a particular warehouse or multiple warehouses in an efficient manner.

The inventory management system 400 may include at least one memory 706 and one or more processing units (or processor(s)) 408. The memory 406 may include more than one memory and may be distributed throughout the inventory management system 400. The memory 406 may store program instructions that are loadable and executable on the processor 408 as well as data generated during the execution of these programs. Depending on the configuration and type of memory, the memory 406 may be volatile (such as random access memory (RAM)) and/or non-volatile (such as read-only memory (ROM), flash memory, or other memory). In some examples, the memory 406 may include multiple different types of memory, such as static random access memory (SRAM), dynamic random access memory (DRAM), or ROM. The memory can store the program instructions as a number of modules that configure processor (2) 408 to perform the various functions described herein, for example operating system 422, event detection engine 410, and management module 415.

The memory 406 may include operating system 422 for interacting with the inventory management system 400.

As discussed above, the management module 415 may be configured to manage the movement and operation of the mobile drive units that move movable storage structures throughout an inventory environment. The inventory management system 400 may be configured to manage the determination of operator events, along with management of inventory generally. In some examples, the inventory management system 400 and the management module 415 work in concert to manage inventory.

The event detection engine 410 can include one or more modules, engines, components or the like configured to implement the techniques described herein. For example, the event detection engine 410 may include image processing functionality in order to display contextual information at a determined head or eye level of an operator. The event detection engine 410 may also include inventory management functionality to generate and store operator events.

The processor 408 may include one or more general purpose computers, dedicated microprocessors, or other processing devices capable of communicating electronic information. Examples of the processor 408 include one or more application-specific integrated circuits (ASICs), field programmable gate arrays (FPGAs), digital signal processors (DSPs) and any other suitable specific or general purpose processors. Computer-executable instruction, software or firmware implementations of the processor may include computer-executable or machine-executable instructions written in any suitable programming language to perform the various functions described. The processor 408 may be implemented as appropriate in hardware, computer-executable instructions, software, firmware, or combinations thereof. Computer-executable instruction, software or firmware implementations of the processor 408 may include computer-executable or machine-executable instructions written in any suitable programming language to perform the various functions described.

In some examples, the inventory management system 400 may also include additional storage 412, which may include removable storage and/or non-removable storage. The additional storage 412 may include, but is not limited to, magnetic storage, optical disks, and/or tape storage. The disk drives and their associated computer-readable media may provide non-volatile storage of computer-readable instructions, data structures, program modules, and other data for the computing devices. The memory 406 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The inventory management system 400 may also include input/output (I/O) device(s) and/or ports 414, such as for enabling connection with a keyboard, a mouse, a pen, a voice input device, a touch input device, a display, speakers, a printer, or other I/O device.

The inventory management system 400 may also include a user interface 416. The user interface 416 may be utilized by an operator or other authorized user to access portions of the inventory management system 400. In some examples, the user interface 416 may include a graphical user interface, web-based applications, programmatic interfaces such as application programming interfaces (APIs), or other user interface configurations. The user interface 416 can include the dynamically configurable contextual information displays described herein.

The inventory management system 400 may also include a data store 418. In some examples, the data store 418 may include one or more data stores, databases, data structures, or the like for storing and/or retaining information associated with the inventory management system 400. Thus, the data store 418 may include data structures, such as an item inventory database 422, display data repository 424, and item information data repository 426.

The inventory database 422 may be used to retain information about manifests or lists of items within the inventory system. For example, this can include information about inventory items placed or expected to be placed in the storage structure(s). The information in the inventory database 422 can be generated by operators, whether human or automated, who place and retrieve inventory items. For example, the human operator who stows items in the storage structure can use a user device to scan barcodes on inventory items and other barcodes associated with compartments in the storage structure to indicate what inventory items are placed where in the storage structure. This information can also indicate inventory tracking events such as inventory placement events and inventory removal events.

Display data repository 424 can be used to store information relating to determined head and/or eye levels of the operator(s) working within the inventory system. Display data repository 424 can also include, in some embodiments, operator information usable for determining an estimated head or eye level indirectly, for example from an intersection of an arm of the operator with a plane, or position correlation information that assists with correlating determined head or eye locations with a position on a display.

Item information repository 426 can be used to store contextual and location information for some or all of the items in the item inventory database 422. In some embodiments the item information repository 426 can be incorporated into the item inventory database 422.

Figure 5:
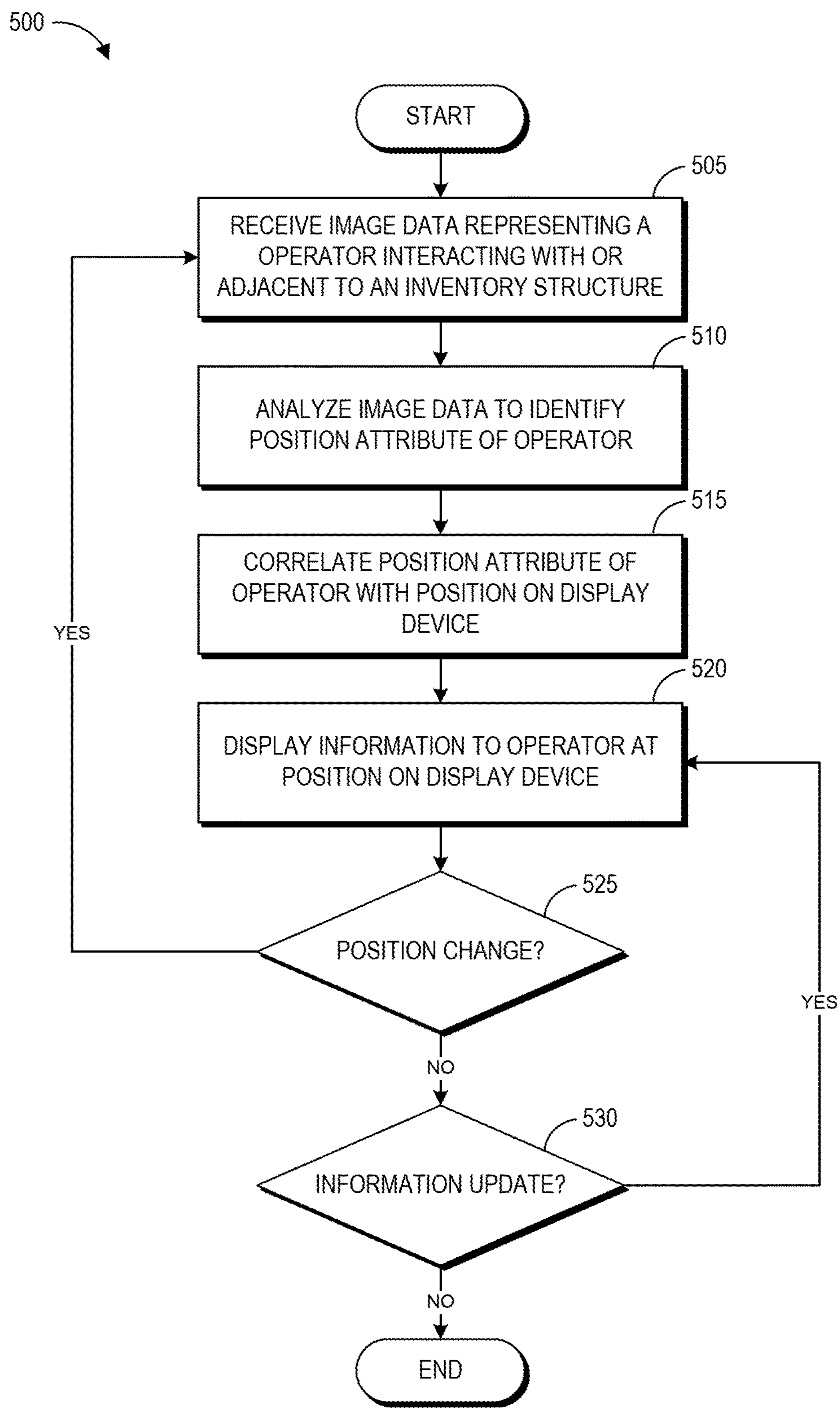
FIG. 5 depicts a flow chart including example acts or techniques relating to dynamic placement of inventory information, in accordance with at least one example.

FIG. 5 depicts a flow chart including example acts or techniques relating to a process 500 for dynamic placement of inventory information. Process 500 can be implemented by the inventory management system 400 in some embodiments.

The process 500 may begin at block 505 by the inventory management system 400 receiving image data representing one or more images of an operator interacting with a storage structure including an inventory item. The image data can be visible image data, infrared or ultraviolet image data, thermal image data, LiDAR image data, 3D image data, stereoscopic image data, or any of the other kinds of image data described above. Some embodiments can implement indoor object tracking data, accelerometer data from an accelerometer worn by the operator, operator input, or other types of position-indicating data in addition to or in place of image data.

At block 510, the inventory management system 400 can analyze the image data to identify one or more position attributes of the operator in the image data. A position attribute can be any of the location of the head and/or eye(s) of the operator, gaze angle of the operator, movement of the irises of the operator, the posture of the operator (for example, kneeling, standing, or elevated on a ladder), the reach angle of the operator (for example reaching upward or downward relative to the shoulder level of the operator), distance of the operator from a storage structure or display, position data from a wearable sensor on the body of the operator, and positioning of any ladders or stools used by the operator to access items in the storage structure. Any position attribute or combination of position attributes can be used by the inventory management system 400 to determine where an operator is looking or is likely to look on a display. The inventory management system 400 can identify the location of the head, eyes, or both depending upon the type of data received.

At block 515, the inventory management system 400 can correlate the identified position attribute with a position or level on a display device. The position can be, in some embodiments, a vertical offset from a top or bottom of the display, a y-coordinate representing a height on a display 30 being x pixels wide and y pixels tall, or another indication of a height level associated with display 30. The vertical displacement between a floor on which the display rests and the determined position on the display should approximately correspond to the vertical displacement between the floor and the eye or head level of the operator.

At block 520, the inventory management system 400 can cause display of information to the operator at the position or level on the display device. As described above, in some implementations this can include presenting contextual information to the operator at the identified position and presenting location pointer(s) information to the operator in another location(s).

At decision block 525, the inventory management system 400 can determine whether the position of the operator has changed. This can involve receiving updated image data captured at a time point after the initial image data, identifying the location of the head and/or eye(s) of the operator in the updated image data, and comparing the location to the previously determined location. If the difference is greater than a threshold, for example two inches or less in some implementations, then the inventory management system 400 can determine that the position of the operator has changed and loop back to block 505. If the difference is less than the threshold, then the inventory management system 400 can determine that the position of the operator has not changed and can transition to block 530.

At decision block 530, the inventory management system 400 can determine whether there is an update of information for display to the operator. For example if the operator has completed a task relating to one item, then the inventory management system 400 can determine that the operator should perform an assignment relating to a different item and can retrieve contextual and/or location information about the different item. If the inventory management system 400 determines that there is an update of information then the process 500 can loop to block 520 to display the information to the operator at the determined position on the display device. If the management system 400 determines that there is not an update of information then the process 500 can wait for a predetermined idle period before ending.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method for dynamically positioning display information, the method comprising, via one or more computer processors in data communication with a display:

receiving image data representing one or more interactions between an operator and one or both of the display and a storage structure of an inventory system, the storage structure having multiple levels, the display positioned to display information that is visible to the operator while the operator interacts with the storage structure, the display having a height that spans the multiple levels of the storage structure, wherein the image data includes an image of the head of the operator;

analyzing the image data to identify at least a head level of the operator during the one or more interactions;

correlating the identified head level with a position on the display such that a vertical displacement between a floor and the position on the display is approximately equal to a vertical displacement between the floor and the head level of the operator;

receiving contextual information representing an item of the inventory system in the storage structure, the contextual information usable by the operator to identify the item among a plurality of physical items in the storage structure; and causing display of the contextual information to the operator at the position on the display.

2. The method of claim 1, further comprising:

tracking a plurality of interactions between the operator and a plurality of storage structures of the inventory system;

predicting, based on the tracked plurality of interactions, a location on the display where the operator looks first in at least one inventory assignment situation; and selecting an initial position on the display at which to display information based at least partly on the location where the operator looks first.

3. The method of claim 1, wherein the image data comprises LiDAR data.

4. The method of claim 1, wherein analyzing the image data comprises identifying the head of the operator in the image data.

5. The method of claim 1, further comprising:

detecting, based on the image data, a change in the head level of the operator to a new head level during the one or more interactions; and updating a display position of the contextual information on the display to correspond to the new head level.

6. The method of claim 1, wherein the head level is an eye level of the operator.

7. The method of claim 1, wherein the display is mounted at a fixed location in a work area.

8. The method of claim 7, wherein the storage structure is coupled to a mobile drive unit that moves the storage structure, and the method comprises causing the mobile drive unit to move the storage structure to a position adjacent to the fixed location of the display.

9. The method of claim 1, further comprising:

determining a bin of the storage structure that contains the item; and causing a projector to illuminate the bin.

10. The method of claim 1, wherein the height of the display is in the range of five to ten feet.

11. The method of claim 1, wherein the height of the display is in the range of seven to nine feet.

12. A system comprising:

a display that is positioned to display information that is visible to an operator while the operator interacts with a storage structure that holds physical inventory items, the storage structure having multiple levels, the display having a height that spans the multiple levels; and a computing system comprising one or more processors, the computing system programmed to implement a process that comprises:

receiving image data showing at least a head of the operator as the operator interacts with one or both of the display and the storage structure;

determining at least a head level of the operator by analyzing the image data;

receiving contextual information representing an item of inventory stored in the storage structure, the contextual information usable by the operator to identify the item among a plurality of physical items in the storage structure;

determining a display position on the display corresponding to the determined head level such that a vertical displacement between a floor and the display position is approximately equal to a vertical displacement between the floor and the head level of the operator; and causing the contextual information to be displayed on the display at said display position.

13. The system of claim 12, wherein the image data comprises LiDAR data.

14. The system of claim 12, wherein the computing system is programmed to detect the head of the operator in the image data.

15. The system of claim 12, wherein the computing system is additionally programmed to:

detect, based on the image data, a change in the head level of the operator to a new head level; and update a display position of the contextual information on the display to correspond to the new head level.

16. The system of claim 12, wherein the head level is an eye level of the operator.

17. The system of claim 12, wherein the display is mounted at a fixed location in a work area.

18. The system of claim 17, wherein the storage structure is coupled to a mobile drive unit that moves the storage structure, and the computing system is programmed to cause the mobile drive unit to move the storage structure to a position adjacent to the fixed location of the display.

19. The system of claim 12, wherein the computing system is additionally programmed to:

determine a bin of the storage structure that contains the item; and cause a projector to illuminate the bin.

20. The system of claim 12, wherein the height of the display is in the range of five to ten feet.

21. The system of claim 12, wherein the height of the display is in the range of seven to nine feet.

22. The system of claim 12, wherein the display is a touch-sensitive display.

* * * * *